United States Patent
Yee et al.

(10) Patent No.: US 8,232,791 B2
(45) Date of Patent: Jul. 31, 2012

(54) SOFT STARTING DRIVER FOR PIEZOELECTRIC DEVICE

(75) Inventors: Harold Gee Yee, Chandler, AZ (US); Douglas James Andersn, Queen Creek, AZ (US)

(73) Assignee: World Properties, Inc., Lincolnwood, IL (US)

( * ) Notice: Subject to any disclaimer, the term of this patent is extended or adjusted under 35 U.S.C. 154(b) by 331 days.

(21) Appl. No.: 12/587,387

(22) Filed: Oct. 5, 2009

(65) Prior Publication Data

US 2011/0080148 A1    Apr. 7, 2011

(51) Int. Cl.
*G05F 1/56* (2006.01)
(52) U.S. Cl. .......... 323/285; 363/16
(58) Field of Classification Search .......... 323/222, 323/223, 282–288, 271–273, 207; 363/16–20, 363/21.04, 21.06, 59, 65, 73, 98, 132; 315/224, 315/291, 307, 312
See application file for complete search history.

(56) References Cited

U.S. PATENT DOCUMENTS

| | | | |
|---|---|---|---|
| 3,913,000 A | 10/1975 | Cardwell, Jr. | 321/2 |
| 4,527,096 A | 7/1985 | Kindlmann | 315/169.3 |
| 5,313,141 A | 5/1994 | Kimball | 315/169.3 |
| 5,430,362 A * | 7/1995 | Carr et al. | 318/779 |
| 5,854,543 A * | 12/1998 | Satoh et al. | 315/307 |
| 6,614,208 B2 * | 9/2003 | Narita | 323/283 |
| 6,853,173 B2 * | 2/2005 | Caine et al. | 323/285 |
| 7,106,036 B1 | 9/2006 | Collins | 323/282 |
| 7,129,679 B2 | 10/2006 | Inaba et al. | 323/222 |
| 7,468,573 B2 | 12/2008 | Dai et al. | 310/317 |
| 7,659,678 B2 * | 2/2010 | Maiocchi | 318/400.22 |
| 7,675,281 B1 * | 3/2010 | Holt et al. | 323/288 |
| 7,906,943 B2 * | 3/2011 | Isobe et al. | 323/223 |

FOREIGN PATENT DOCUMENTS

KR    1020060128194    12/2006

* cited by examiner

*Primary Examiner* — Rajnikant Patel
(74) *Attorney, Agent, or Firm* — Cantor Colburn LLP

(57) ABSTRACT

A driver includes a boost converter, a pulse width modulator controlling the boost converter, and a timer controlling the pulse width modulator. The timer, such as a digital counter, causes the pulse width modulator to produce narrow pulses unless or until the end of a period is reached, at which point the pulse width modulator is not controlled by the timer.

7 Claims, 1 Drawing Sheet

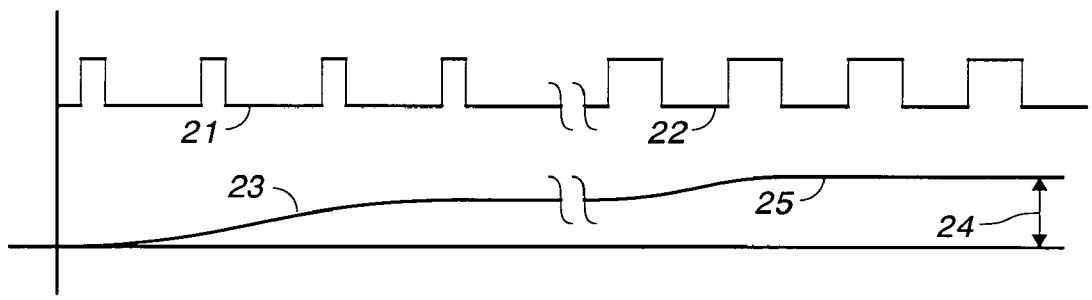
F I G. 2
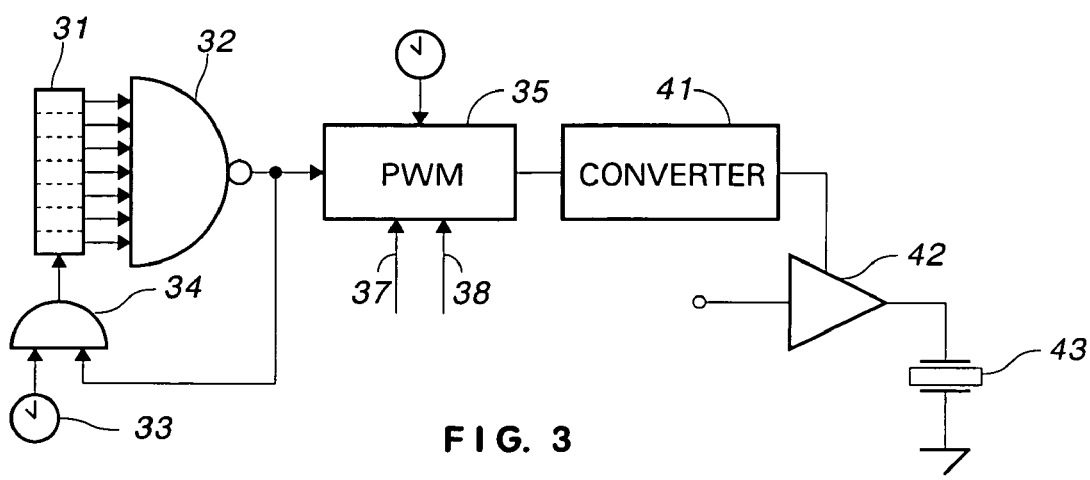
F I G. 3

SOFT STARTING DRIVER FOR PIEZOELECTRIC DEVICE

BACKGROUND

This invention relates to a voltage boost circuit and, in particular, to a boost circuit that limits starting current to a load, such as a piezoelectric driver.

A piezoelectric actuator requires high voltage, greater than typical battery voltages of 1.5 to 12.6 volts. A "high" voltage is 20-200 volts, with 100-120 volts currently being a typical drive voltage. Some line driven power supplies for actuators provide as much as 1000 volts. Producing high voltage from a battery is more difficult. As noted in U.S. Pat. No. 7,468,573 (Dai et al.), the high voltage required "to drive piezoelectric actuators in today's small electronic devices is undesirable." The solution proposed in the '573 patent is to use two pulses of "lower" voltage instead of a single pulse at high voltage. The "lower" voltage is not disclosed. Single layer actuators generally require a higher voltage than multilayer actuators. Multilayer actuators have the advantage of providing greater feedback force than single layer actuators.

Thus, there is a need for a battery powered driver, that is, a single chip power supply, for piezoelectric devices. A voltage boost circuit can be used to convert the low voltage from a battery to a higher voltage for the driver. In a boost converter, the energy stored in an inductor is supplied to a capacitor as pulses of current at high voltage.

FIG. 1 is a schematic of a basic boost converter well known in the art; e.g. see U.S. Pat. No. 3,913,000 (Cardwell, Jr.) or U.S. Pat. No. 4,527,096 (Kindlmann). Inductor 11 and transistor 12 are connected in series between supply 13 and ground. When transistor 12 turns on (conducts), current flows through inductor 11, storing energy in the magnetic field generated by the inductor. Current through inductor 11 increases quickly, depending upon battery voltage, inductance, internal resistances, and the on-resistance of transistor 12. When transistor 12 shuts off, the magnetic field collapses at a rate determined by the turn-off characteristic of transistor 12. The rate of collapse is quite rapid, much more rapid than the rate at which the field increases. The voltage across inductor 11 is proportional to the rate at which the field collapses. Voltages of one hundred volts or more are possible. Thus, a low voltage is converted into a high voltage.

When transistor 12 shuts off, the voltage at junction 15 is substantially higher than the voltage on capacitor 14 and current flows through diode 16, which is forward biased. Each pulse of current charges capacitor 14 a little and the charge on the capacitor increases incrementally. At some point, the voltage on capacitor 14 will be greater than the supply voltage. Diode 16 prevents current from flowing to supply 13 from capacitor 14.

A problem with the converter shown in FIG. 1 is that, when capacitor 14 is not charged, the voltage across diode 16 is maximum and current is limited by the internal resistance of the inductor. Adding resistance to reduce current reduces the efficiency of the circuit during normal operation. A high current results in a high voltage that can damage piezoelectric or other devices powered by the converter. The high current also puts a significant load on the low voltage battery powering the boost circuit.

It is known in the art that pulse width, i.e. the period during which transistor 12 conducts, affects current (as long as the inductor does not saturate). Over the years, the circuit of FIG. 1 has been embellished with various feedback loops, some of which modulate pulse width; e.g., U.S. Pat. Nos. 7,106,036 (Collins) and 7,129,679 (Inaba et al.) The '679 patent discloses that gradually changing duty cycle during startup gradually increases the output voltage from the converter. The gradual change is accomplished by a closed loop feedback circuit that significantly increases the cost, complexity, and power consumption of the converter.

In view of the foregoing, it is therefore an object of the invention to provide a soft starting, high voltage driver for piezoelectric devices.

Another object of the invention is to minimize power drain by single chip, battery powered drivers.

A further object of the invention is to limit peak current in a boost converter, thereby preventing saturation of the inductor, minimizing power consumption, and avoiding damage to loads.

Another object of the invention is to provide a simple, soft start mechanism for a boost converter.

A further object of the invention is to provide an open loop, soft start converter.

SUMMARY OF THE INVENTION

The foregoing objects are achieved in the invention in which a driver includes a boost converter, a pulse width modulator controlling the boost converter, and a timer controlling the pulse width modulator. The timer causes the pulse width modulator to produce narrow pulses unless or until the end of a period is reached, at which point the pulse width modulator is not controlled by the timer but by other means. The timer is preferably a digital counter coupled to a source of clock signals in the driver.

BRIEF DESCRIPTION OF THE DRAWINGS

A more complete understanding of the invention can be obtained by considering the following detailed description in conjunction with the accompanying drawings, in which:

FIG. 2 is a chart of waveforms useful in explaining the operation of the invention; and FIG. 3 is a block diagram of a driver constructed in accordance with a preferred embodiment of the invention.

DETAILED DESCRIPTION OF THE INVENTION

Figure 1:
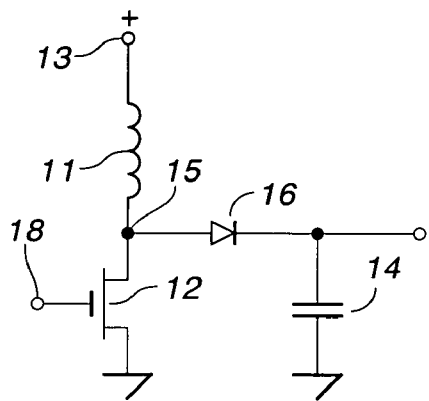
FIG. 1 is a schematic of a boost converter constructed in accordance with the prior art.

In accordance with one aspect of the invention, illustrated in FIG. 2, an arbitrary number of narrow pulses 21 are applied to gate 18 (FIG. 1) of transistor 12 when the converter is first turned on or after a reset. The pulses are narrow in the sense that the field induced in inductor 11 is well below saturation. After the arbitrary number of pulses, wider pulses 22 are applied to gate 18 (FIG. 1) of transistor 12 and continue to be applied until the driver is shut off or is reset. Pulses 21 provide less charge per pulse than pulses 22, thereby providing reduced initial current to capacitor 14 (FIG. 1). The voltage across capacitor 14 increases, as indicated by curve 23, but can not reach normal operating voltage. Only after the pulse width is increased does the output voltage from the converter reach operating level 24, as indicated by curve 25. Without the soft start, peak current can be twice the steady state current. With the soft start, peak current is less than the steady state current.

In one embodiment of the invention, the gate duty cycle was fifty percent during start-up. The duty cycle remained at this value for 128 clock cycles, then the duty cycle increased to an optimal value for steady state. Optimal performance with the particular circuit used was achieved with a duty cycle of seventy-five to ninety percent. The clock rate was 130 kHz to 175 kHz. This corresponds to a start-up time of 0.985 to 0.731 milliseconds.

A clock rate in this range of frequencies enables one to use inductors that are physically small and less expensive. The inductors used in one embodiment of the invention had inductances of 33 µH and 68 µH. Current increases with inductance and decreases with frequency. Smaller inductors can be used but are more difficult to make with commercially acceptable precision or cost.

FIG. 3 is a block diagram of a driver constructed in accordance with a preferred embodiment of the invention. Register or counter 31 has each stage thereof coupled to NAND gate 32. As pulses from clock 33 are counted, the bit pattern in the register will eventually become all ones (11111111), e.g. 7 FH in hexadecimal notation or 127 in decimal notation. AND gate 34 prevents further counting after the maximum count is reached, until the system is reset. Power on is functionally the same as a reset.

While the output from NAND gate 32 is high (logic 1), pulse width modulator 35 produces narrow pulses 21 (FIG. 2). When the bit pattern in register 31 is all ones, the output from NAND gate 32 will switch from high to low (logic 0), causing pulse width modulator 35 to produce wider pulses 22 (FIG. 2). Thus, initially, converter 41 produces a lower voltage than the normal operating voltage and the supply voltage for amplifier 42, which drives piezoelectric device 43, is less than normal. Thus, excess voltage is prevented from reaching piezoelectric device 43. When normal operating voltage is achieved, excess voltage cannot occur.

When the output from NAND gate 32 goes low, it releases control of pulse width modulator 35 to other inputs, such as inputs 37 and 38. These inputs can control, for example, frequency and pulse width, and be coupled to suitable loops for voltage regulation or other needs. Generally, pulse width will increase, as indicated in FIG. 2, but this is not to imply a limit on control inputs 37 and 38, which may, momentarily at least, cause the pulse width to be smaller than pulses 21 (FIG. 2).

Circuits for pulse width modulation are well known in the art. Pulse width can be determined by a variety of circuits. For example, the count in a counter can represent pulse width and the output from NAND circuit 32 can control one bit of such a counter.

The invention thus provides a soft starting driver for piezoelectric devices requiring a boost converter for operating from a battery. The driver limits starting current and minimizes power drain. Peak current is limited, thereby preventing saturation of the inductor or damage to loads. Open loop control provides a simple, soft start mechanism for a boost converter. The invention is easily implemented in a single integrated circuit using existing libraries for counters, logic, and pulse width modulating circuits, combined in accordance with the invention.

Having thus described the invention, it will be apparent to those of skill in the art that various modifications can be made within the scope of the invention. For example, the specific values given are by way of example only. The use of a NAND gate (negative logic) does not mean that positive logic could not be used instead. Other types of counters, with different peripheral logic, can be used instead; e.g. using a carry bit to indicate the end of start-up. Any number can be used to indicate end of start-up, e.g. 43 H, with suitable peripheral logic for sensing that number.

The invention also can be used with single output inverters such as described in U.S. Pat. No. 5,313,141 (Kimball). The pulse width modulator can use the same clock signal as the counter or some other clock signal.

What is claimed as the invention is:

1. In a driver including a boost converter and a pulse width modulator controlling the boost converter, the improvement comprising:
a timer coupled to the pulse width modulator, said timer causing the pulse width modulator to produce narrow pulses unless a predetermined period has expired.

2. The driver as set forth in claim 1 wherein the pulse width modulator is not controlled by the timer after the predetermined period has expired.

3. The driver as set forth in claim 1 wherein the predetermined period begins with a reset.

4. The driver as set forth in claim 1 wherein said timer includes a digital counter set to count a predetermined number of clock pulses.

5. The driver as set forth in claim 4 wherein the counter has a plurality of stages and the driver further includes logic circuitry coupled to at least some of the stages for defining said predetermined number.

6. In a driver including a boost converter and a pulse width modulator controlling the boost converter, the improvement comprising:
a timer coupled to the pulse width modulator, said timer including a digital counter set to count a predetermined number of clock pulses and said counter includes a plurality of stages;
logic circuitry coupled to at least some of the stages for defining said predetermined number;
wherein said logic circuitry includes a NAND gate coupled to said stages and having a first output coupled to said pulse width modulator; and
said timer causing the pulse width modulator to produce narrow pulses until a predetermined period has expired.

7. The driver as set forth in claim 6 wherein said logic circuitry further includes an AND gate having a first input coupled to a source of clock pulses, a second input coupled to said first output, and a gate output coupled to said counter for interrupting clock pulses after said predetermined period has expired.

* * * * *